United States Patent
Rumbaugh et al.

(10) Patent No.: US 7,710,973 B2
(45) Date of Patent: May 4, 2010

(54) ERROR MASKING FOR DATA TRANSMISSION USING RECEIVED DATA

(75) Inventors: Stephen R. Rumbaugh, Martinez, CA (US); Gary M. Kolstoe, Fremont, CA (US)

(73) Assignee: Sofaer Capital, Inc., London (GB)

( * ) Notice: Subject to any disclaimer, the term of this patent is extended or adjusted under 35 U.S.C. 154(b) by 284 days.

(21) Appl. No.: 11/880,463

(22) Filed: Jul. 19, 2007

(65) Prior Publication Data

US 2009/0022157 A1    Jan. 22, 2009

(51) Int. Cl.
*H04L 12/56* (2006.01)
*G08C 25/00* (2006.01)

(52) U.S. Cl. .............. 370/394; 370/352; 709/231; 714/746

(58) Field of Classification Search .............. None
See application file for complete search history.

(56) References Cited

U.S. PATENT DOCUMENTS

| | | | | |
|---|---|---|---|---|
| 4,748,620 A * | 5/1988 | Adelmann et al. | ......... | 370/394 |
| 5,883,891 A * | 3/1999 | Williams et al. | ............ | 370/356 |
| 6,038,231 A * | 3/2000 | Dolby et al. | ................ | 370/394 |
| 6,930,982 B2 * | 8/2005 | Jagadeesan | ................. | 370/252 |
| 6,952,668 B1 * | 10/2005 | Kapilow | ..................... | 704/206 |
| 7,145,484 B2 * | 12/2006 | Moriya et al. | ................. | 341/76 |
| 7,324,937 B2 * | 1/2008 | Thyssen et al. | ............ | 704/219 |
| 2003/0078769 A1 * | 4/2003 | Chen | ......................... | 704/211 |
| 2004/0017811 A1 * | 1/2004 | Lam | .......................... | 370/394 |
| 2005/0049853 A1 * | 3/2005 | Lee et al. | .................... | 704/201 |
| 2005/0166124 A1 * | 7/2005 | Tsuchinaga et al. | ........ | 714/776 |
| 2006/0182086 A1 * | 8/2006 | Dowdal et al. | .............. | 370/352 |
| 2006/0209955 A1 * | 9/2006 | Florencio et al. | ....... | 375/240.12 |
| 2006/0265216 A1 * | 11/2006 | Chen | ......................... | 704/228 |
| 2008/0046235 A1 * | 2/2008 | Chen | ......................... | 704/228 |
| 2009/0006084 A1 * | 1/2009 | Chen | ......................... | 704/211 |

\* cited by examiner

*Primary Examiner*—Hong Cho
*Assistant Examiner*—Robert C Scheibel
(74) *Attorney, Agent, or Firm*—Blakely Sokoloff Taylor & Zafman LP

(57) ABSTRACT

A method and apparatus for error masking for data transmission using received data. An embodiment of a method includes receiving a first data packet, where the first data packet contains multiple data elements, the first data packet being a data packet in a data stream. The method further includes determining that one or more data packets are missing from the data stream, and generating one or more data packets to replace the one or more missing data packets based at least in part on the one or more data elements of the first data packet.

17 Claims, 9 Drawing Sheets

ERROR MASKING FOR DATA TRANSMISSION USING RECEIVED DATA

TECHNICAL FIELD

Embodiments of the invention relate to data transmission. More particularly, embodiments of the invention relate to error masking for data transmission using received data.

BACKGROUND

In transmission of data streams, errors in data often occur as a result of noise, data congestion, or other issues. Data transmission may occur over any medium, including, but not limited to data transmission over a power line, conventional wires or cables, or wireless transmission.

Conventional systems may provide for methods to detect errors that occur in data. For example, data may be sent in sequence, and the receiving system may detect when data is not received in sequence. Further, the process may allow for retransmission of certain data packets or frames to obtain missing data that is not received in the proper sequence.

However, if data delivery is time sensitive, different factors may come into play regarding the data. There may not be sufficient time to retransmit missing data packets or frames in certain circumstances, and thus the data may not be recoverable in time to be of any use to the receiving device. If the missing data is not recovered, then the receiving system generally is required to either to continue operation without the missing data, or to fail in operation.

SUMMARY OF THE INVENTION

A method and apparatus are provided for error masking for data transmission using received data.

In a first aspect of the invention, a method includes receiving a first data packet, where the first data packet contains multiple data elements, the first data packet being a data packet in a data stream. The method further includes determining that one or more data packets are missing from the data stream, and generating one or more data packets to replace the one or more missing data packets based at least in part on the one or more data elements of the first data packet.

In a second aspect of the invention, an apparatus includes a receiver to receive data packets, where the data packets have a defined sequence, and a buffer to hold one or more received data packets. The apparatus further includes a processor to process received data packets, where the processing of received data packets includes generation of one more pseudo data packets to mask one or more data packets that are missing in the sequence.

In a third aspect of the invention, a system includes a transmitting unit, where the transmitting unit is to transmit a stream of data packets, the data packets being time sensitive. The system also includes a receiving unit, where the receiving unit to receive the stream of data packets from the transmitting unit. The receiving unit is to mask one or more data packets that are missing from the stream of data packets based at least in part on one or more received data packets.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
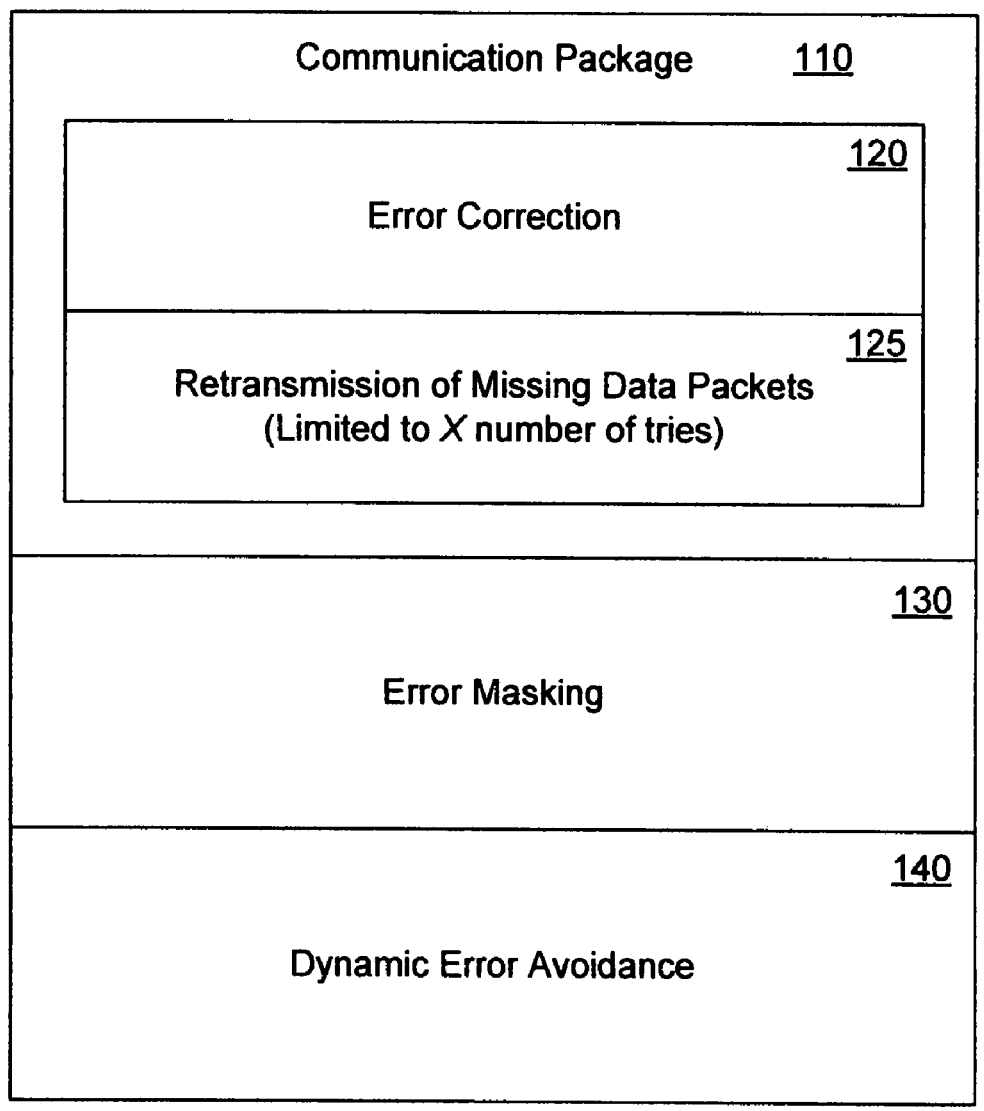
FIG. 1 is an illustration of an embodiment of processes that may be implemented in a system to address data errors.

An embodiment of the invention concerns error masking for data transmission using received data.

As used herein:

"Data transmission" means the transmission of data through any transmission medium, including, but not limited to, transmission over a power line, conventional wires or cables, or wireless transmission medium.

"Data packet" means a block or unit of data.

In an embodiment of the invention, errors in data transmission are masked using received data. In an embodiment, one or more data packets may be missing in a data transmission, and a system masks the missing data elements using the received data. In an embodiment, the system replaces the data of the missing data packets with "pseudo data packets" that are generated based at least in part on one or more received data packets.

Transmission of time sensitive data has different characteristics and requirements than the transmission of other data that is not subject to such time limitations. Time sensitive data may be, for example, characterized by the existence of a designated time slot, with a beginning and ending time, during which the data transmitted in a specified data packet is scheduled to be present in the receiving device and available for processing or action. Determination of which time slot is designated for a given packet may depend on certain established synchronization requirements. In such circumstances, the processing or other actions of the receiving device are required to occur with a specified time relationship to other events detected or initiated by the transmitting unit. In a simple example, the data of the Nth data packet may be scheduled to be processed or acted upon in the Nth time slot after the initial packet of data is received. Time sensitive data may include, but is not limited to, audio data in which late data cannot be used because the audio signal has been already been produced.

Data that arrives prior to the beginning of the designated time slot, without being excessively early, is considered to be timely, and such data only needs to be queued or otherwise held for processing or action at the designated time. Determination of the maximum allowable time that the data may be early without being too early depends both on the capacity of the receiving device to hold data (such as the size of the available memory buffer) and on maximum allowed lag times between transmission and action by the receiver. However, if the data is received after the end of the designated slot the data is too late, and the receiving device will have already taken action or performed its process without having the valid data to work with. Data arriving between the beginning and ending of the designated time slot may be partially useful, as a portion of the data is too late and the remainder is timely.

In an embodiment, three general strategies may be combined to mitigate problem connected with errors in time sensitive data streams. If errors in data are detected, classic error correction may be utilized at the communication level in both the transmitting and receiving units to provide data without flaws either by correcting the data as the data is received or by retransmitting the data if the does not arrive as expected. For time sensitive data, the allowed number of transmission retries is limited by the requirement that the data not arrive too late for its designated time slot. In an embodiment of the invention, error masking may be implemented in the receiving unit to generate acceptable (per the requirements of the application) pseudo data to substitute for the data contained in a missing packet. In an embodiment, error avoidance may be implemented in the transmitting unit to substitute a low volume of lower quality but acceptable data (per the requirements of the application) that can be supported by the capacity of the transmission media when the capacity is less than is required for reliable transmission of high quality data.

In an embodiment of the invention, full capabilities of an underlying communication package to perform error correction for individual packets may be enabled and active. In addition, retransmission is also enabled, but the retry count is limited by consideration of the time sensitive nature of the data stream and the depth of the queue of previously transmitted data that has not yet been output. Allowable retransmission counts are those which complete before the beginning of the time slot to output the data from the packet being retransmitted. Excessive retries will result in wasting bandwidth transmitting data that is obsolete. In an embodiment of the invention, an output time slot that is allocated to a packet that has failed to successfully retransmit within the selected retry count will be masked by one or more pseudo data packets that are generated using one or more surrounding data packets that have been received.

FIG. 1 is an illustration of an embodiment of processes that may be implemented in a system to address data errors. A system may include a communications package 110 that provides for error correction 120 by the transmitting or receiving unit. In addition, the system may provide for retransmission of missing data packets 125. However, in a system that is time sensitive, the retransmission of data may be limited, such as limiting to a certain number of attempts to retransmit.

In an embodiment of the invention, a system may also provide for error masking 130. In an embodiment of the invention, error masking may include the generation of one more pseudo data packets to replace missing data packets based at least in part on a data packet arriving prior to the missing packet or packets, a data packet arriving after the missing packet or packets, or both. In an embodiment of the invention, the system may also include a process for dynamic error avoidance to reduce data errors 140.

Figure 2:
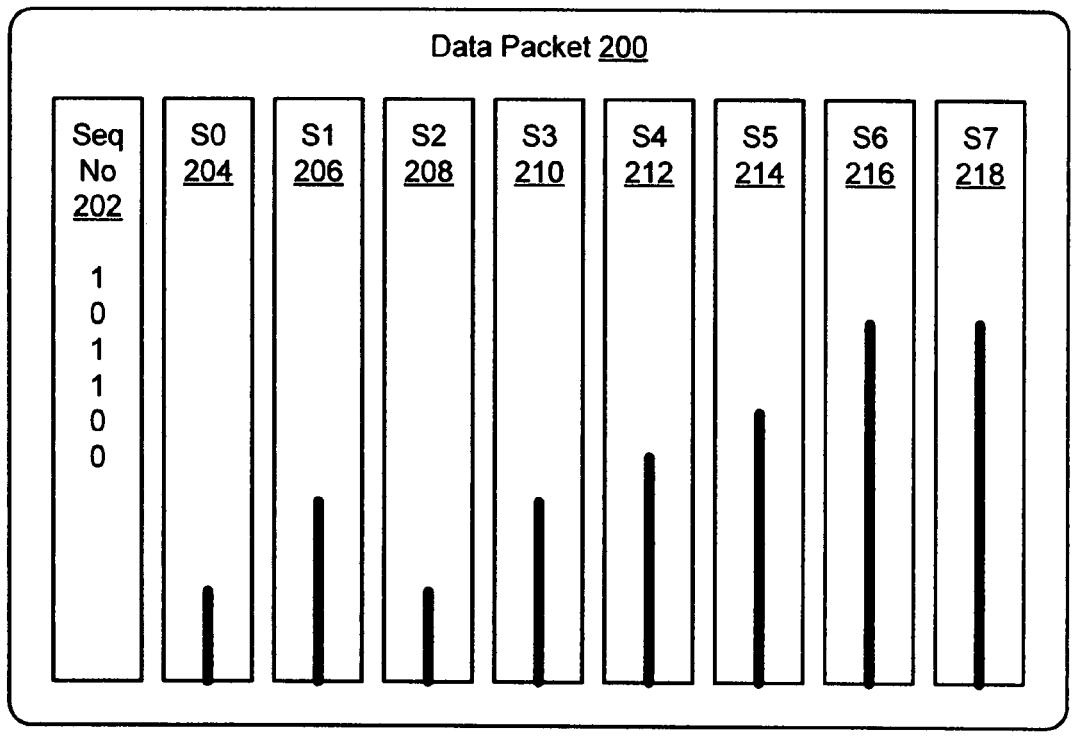
FIG. 2 illustrates an exemplary data packet that may be transmitted and received in an embodiment.

FIG. 2 illustrates an exemplary data packet that may be transmitted and received in an embodiment. In this illustration, a data packet 200 may include a sequence number 202 that indicates where in a data sequence the data packet should be received, and which time slot the data should fall within. In addition, the data packets includes multiple data elements representing samples of an analog signal, illustrated as signal 0 (S0) 204 having a particular value, followed by S1 206, S2 208, S3 210, S4 212, S5 214, S6 216, and S7 218. The samples may, for example, be samples of audio signals with multi-frequency components. In a particular example, the samples may be anywhere between 8 KHz to 195 KHz in frequency. While the figures illustrate the samples as bars for ease of visual illustration, it is understood that the data is being transferred as sample values. Data packet 200 is illustrated as include eight data values, S0 through S7, but embodiments of the invention are not limited to any particular number of data elements.

In an embodiment of the invention, the data elements contained in the data packet 200 are used to generate one or more pseudo data packets to replace missing data packets. In an embodiment, the order of the data elements may be reversed to generate the pseudo data packet so that the transition between the data packet 200 and the generated pseudo data packet is smoothed and thus less noticeable to users or systems. In addition, the amplitude of the data values in the pseudo data packet may fade up from an inaudible level or down from an inaudible level to smooth transitions between data packets.

While for simplicity of language and explanation the data levels are referred to in this description as fading up from or down to "inaudible" levels, such as would be relevant for audio data, embodiments of the invention are not limited to any particular type of data. In other embodiments, the amplitude of relevant data is faded down to or faded up from a certain low level that is not noticeable to users or systems or is otherwise minimally intrusive for the type of data that is being transferred in the data packets.

Figure 3:
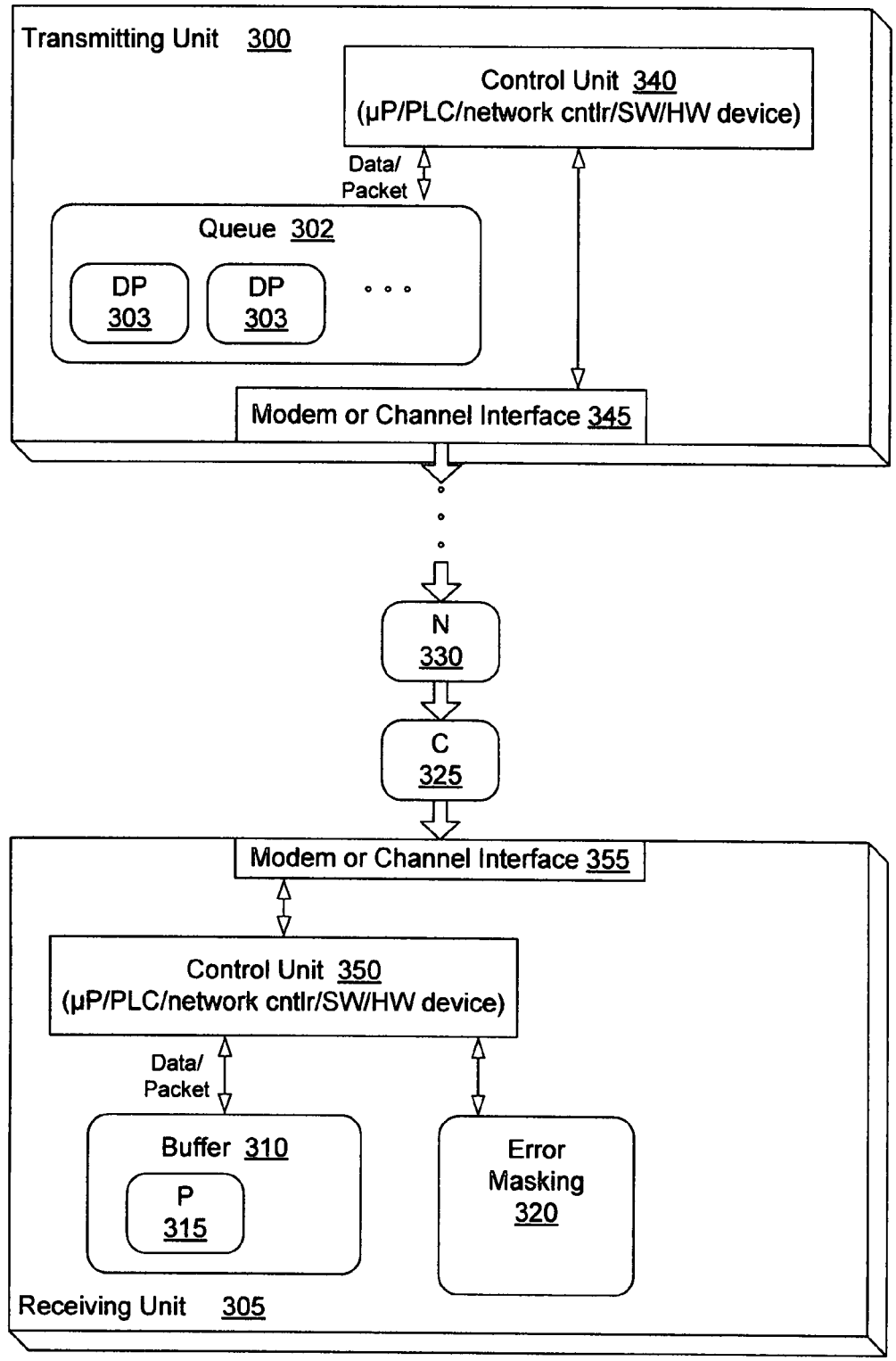
FIG. 3 illustrates an embodiment of data transmissions between units.

FIG. 3 illustrates an embodiment of data transmissions between units. In this illustration, a transmitting unit 300 is in communication with a receiving unit 305. The transmitting unit 300 may include one or more transmission queues 302 containing data packets 303 for transmission. The transmitting unit 300 includes a control unit 340 to control the unit operations. The control unit 340 may be, for example, a microprocessor, programmable logic controller (PLC), network controller, software, or hardware device. The transmitting unit further includes a modem or channel interface 345 to send or receive data.

The receiving unit 305 includes a memory buffer 310 to hold one or more data packets that are received from the transmitting unit 300. As illustrated, a previously received data packet 315 is held temporarily in the memory buffer 310. The receiving unit 305 further includes an error masking module or function 320 to provide for masking of errors that are not correctable, such as missing data packets that are too late to retransmit. The receiving unit 305 receives additional data packets, including a current data packet 325 and any number of next data packets 330. The receiving unit 305 includes a control unit 350 to control the unit operations. The transmitting unit further includes a modem or channel interface 355 to send or receive data.

In an embodiment of the invention, the receiving unit evaluates the current data packet 325 in comparison with the previously received data packet 315. For example, the receiving unit may read a sequence number from each data packet to determine whether an error has occurred and there are thus missing data packets. If there are missing data packets that cannot be transmitted, in an embodiment the error masking module or function 320 utilizes the current data packet 325, the previous data packet 315, or both packets to generate one or more pseudo data packets to replace the missing data packets.

Figure 4:
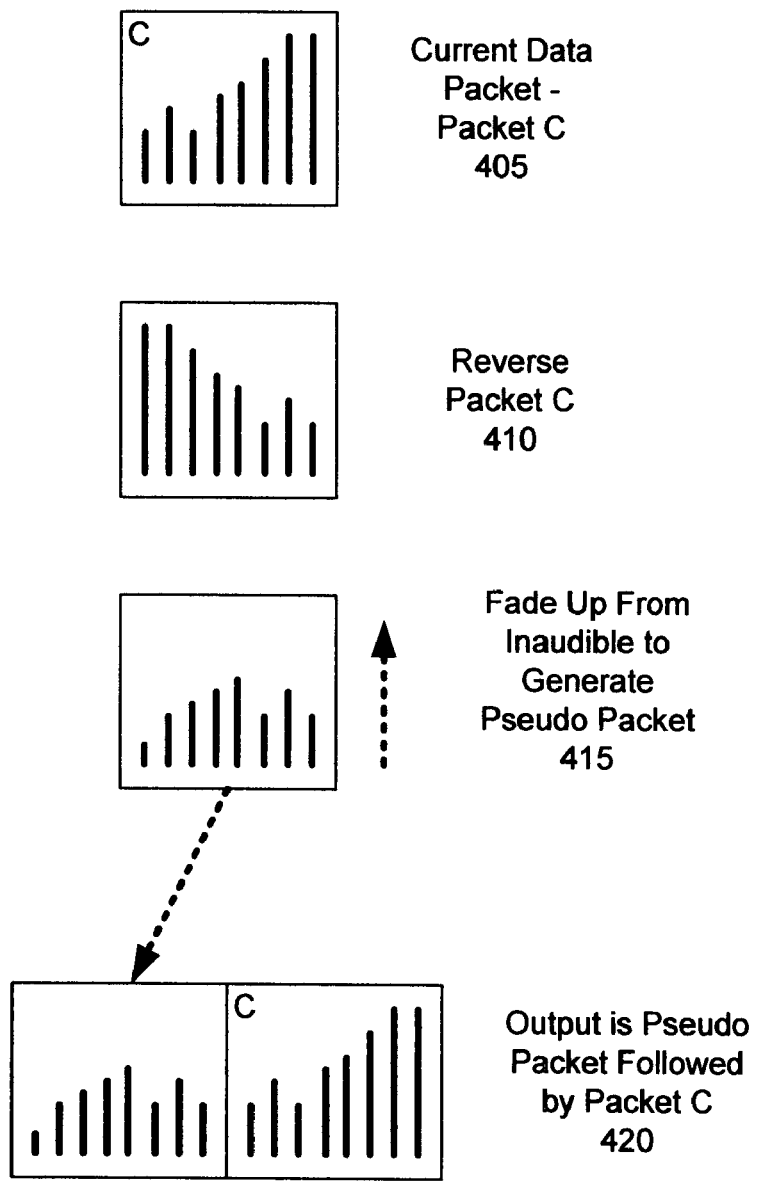
FIG. 4 is an illustration of an embodiment of error masking in a start up condition or in a circumstance in which an output queue is empty.

FIG. 4 is an illustration of an embodiment of error masking in a start up condition or in a circumstance in which an output queue is empty. In this illustration, a current data packet C may be received out of order at start up of the system or when there otherwise is no previous data packet. The current data packet is received 405, with the current data packet including multiple sample values. In order to mask the initial data error, the order of the data of data packet C is reversed 410, allowing for smoother transition with packet C. The data packet is then faded up from an inaudible level to generate a pseudo data packet 415, the fading up creating a transition from the previous state with no data. The output is then the pseudo data packet, which is a reversed and faded up version of data packet C, followed by data packet C.

Figure 5:
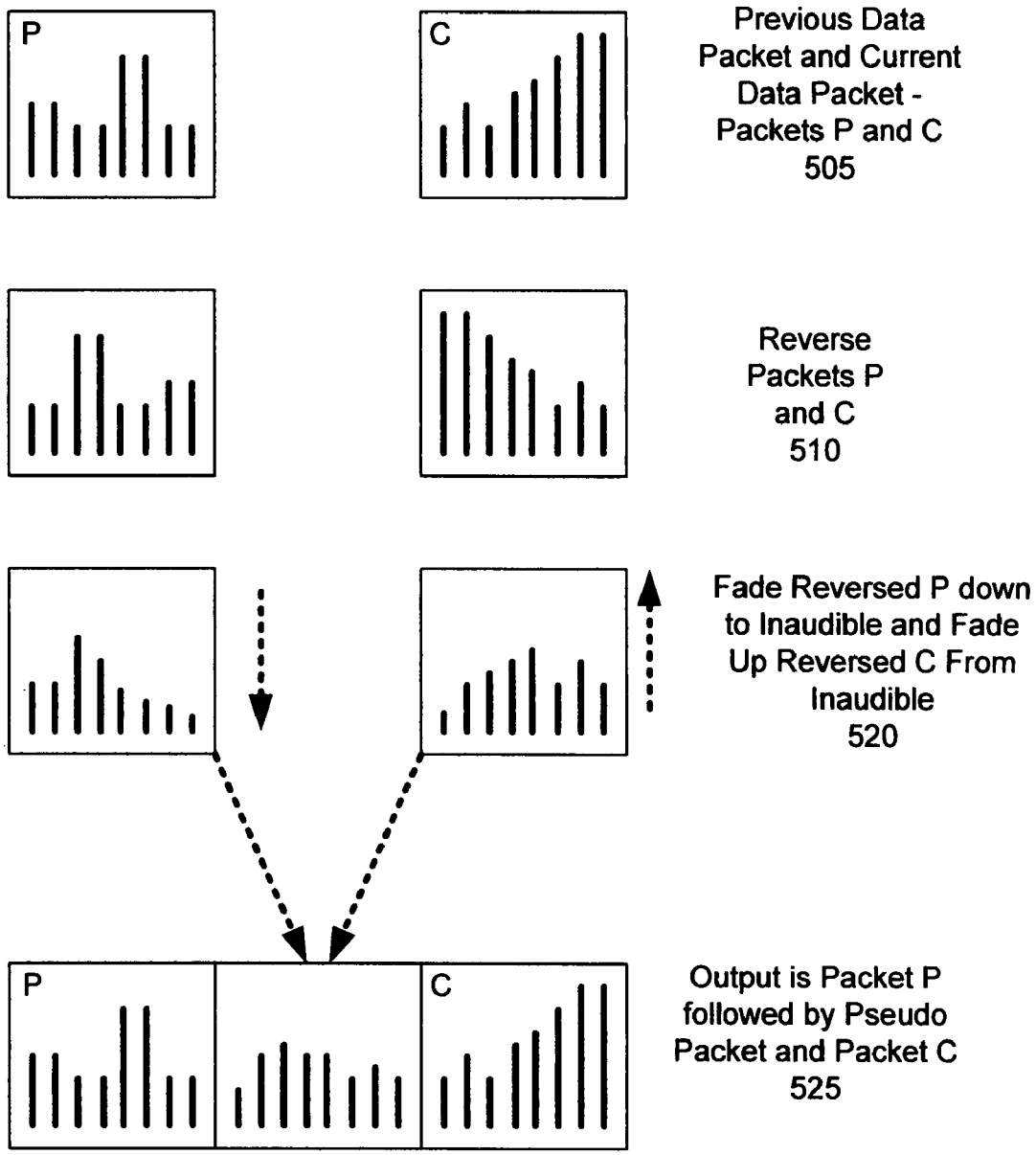
FIG. 5 is an illustration of an embodiment of error masking in circumstances in which a data packet is missing in a data stream.

FIG. 5 is an illustration of an embodiment of error masking in circumstances in which a data packet is missing in a data stream. In this illustration, a previous data packet P and a current data packet C have arrived 505, but a data packet is missing between these packets, such that the sequence number for data packet C is two more than the sequence number of data packet P, rather than only being one sequence number apart. In an embodiment of the invention, the transition between the received data packets is smoothed through use of the data within the received packets to generate a pseudo data packet in the empty time slot. In order to accomplish this, the order of data in packets P and C are reversed 510. The reversed data packet P is faded down to an inaudible level, and the reversed packet C is faded up from an inaudible level 520. The two reversed packets are cross faded together 525, such that the data elements reflect an average of the data elements of each data packets, thereby smoothing the transition both from data packet P and to data packet C.

Figure 6:
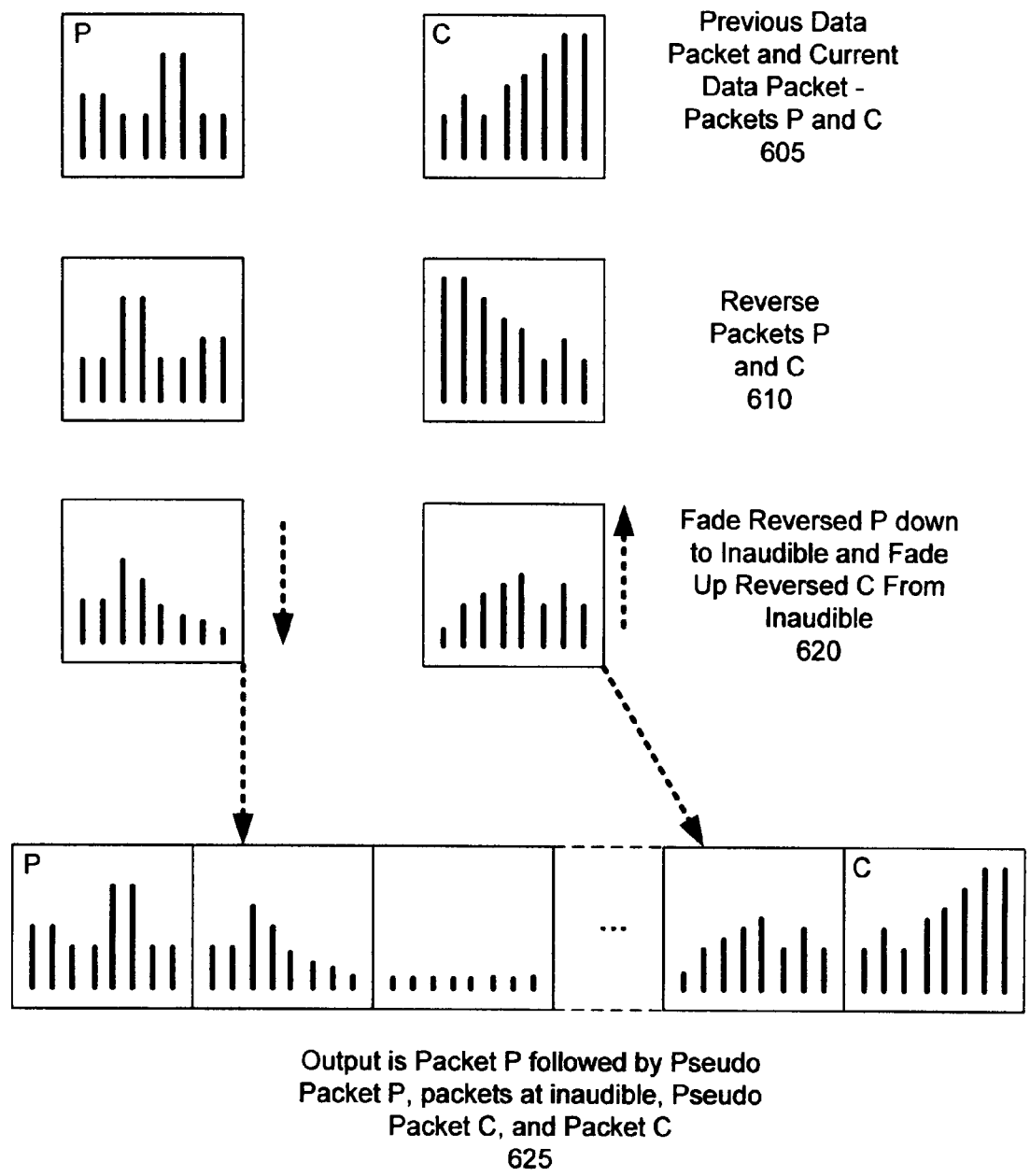
FIG. 6 is an illustration of an embodiment of error masking in circumstances in which multiple data packets are missing in a data stream.

FIG. 6 is an illustration of an embodiment of error masking in circumstances in which multiple data packets are missing in a data stream. In this illustration, a previous data packet P and a current data packet C have arrived 605, but multiple data packets missing between these packets, such that the sequence number for data packet C is greater than two plus the sequence number of data packet P. In an embodiment of the invention, a transition between the data packets is smoothed through use of the data within the packets to generate multiple pseudo data packets to fill the empty time slots. In order to accomplish this, the order of packets P and C are reversed 610. The reversed data packet P is faded down to an inaudible level to create a first pseudo data packet, and the reversed packet C is faded up from an inaudible level to generate a last pseudo data packet 620. The output then is data packet P followed by the first pseudo data packet, with at the opposite end the last pseudo data packet precedes data packet C 625. In one embodiment, if only two pseudo packets are required, then the last pseudo data packet will directly follow the first pseudo data packet. In one embodiment, if additional pseudo data packets are required between the first pseudo data packet and the last pseudo data packet, the data elements in such data packets are maintained at an inaudible level.

Figure 7:
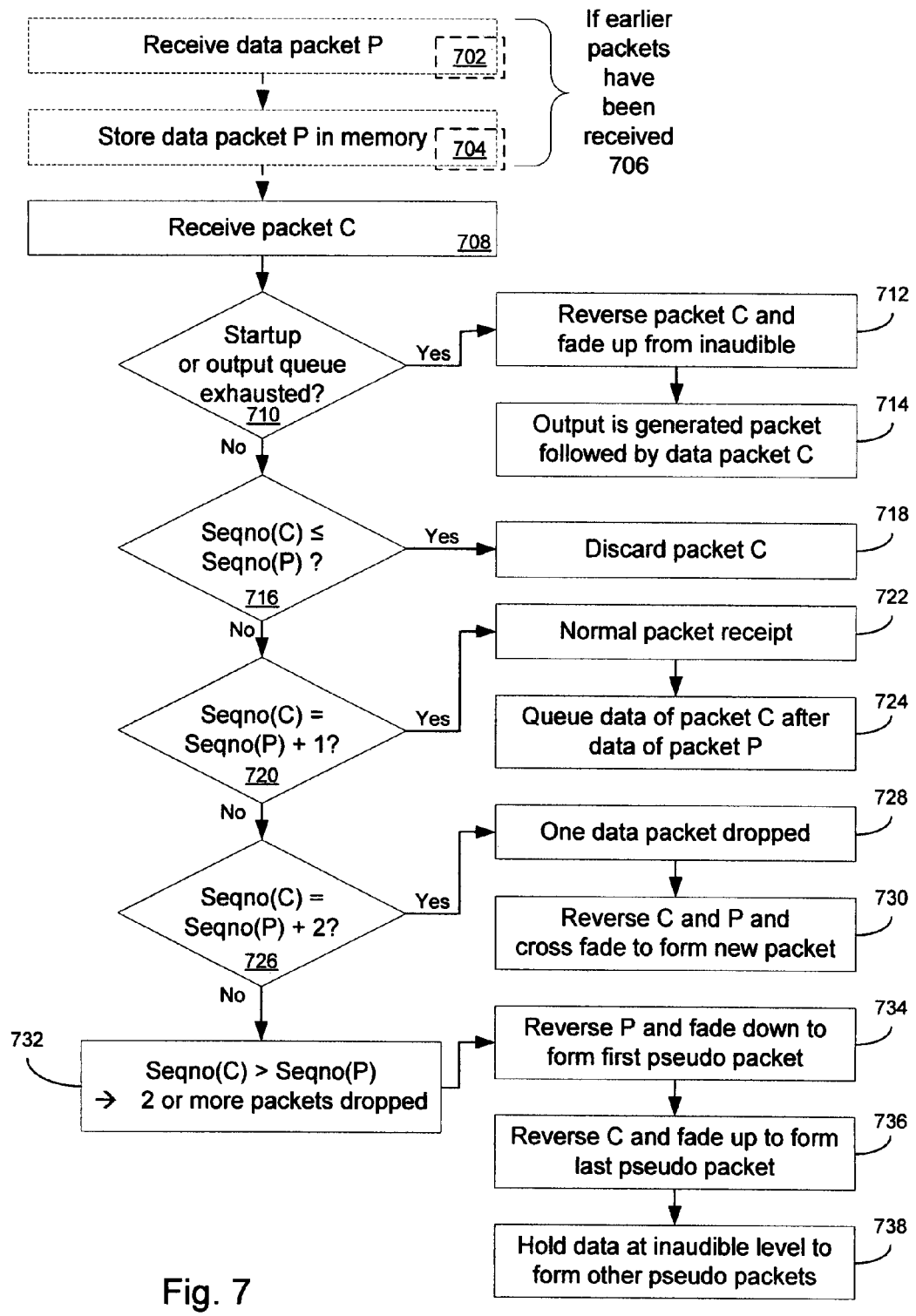
FIG. 7 is a flowchart to illustrate an embodiment of a process for data masking in data transmissions.

FIG. 7 is a flowchart to illustrate an embodiment of a process for data masking in data transmissions. In this process, a data packet P may be received 702 and stored in memory 704. The processes 702 and 704 will occur if one or more earlier packets have been received prior to the current packet 706. The current data packet C is received 708. If the system is starting reception of data or the output queue had become exhausted 710, then there is there is no previous data packet and data packet is the first data packet. In this case, the transition is from no data to the current data packet. In this circumstance, data packet C is reversed and faded up from an inaudible level 712, and the output is the generated pseudo packet followed by data packet C 714.

If instead a sequence number of data packet C is less than or equal to a sequence number of the previous data packet P 716, then the current packet is either a duplicate or has arrived too late, and data packet is discarded 718. If the sequence number of data packet C is equal to the sequence number of data packet P plus one 720, then this is indicative of normal operation 722 (in which the sequence number of each data packet should be one more than the previous data packet). In this case, the data of data packet C will follow the data of data packet P 724, with no pseudo packets being required.

If the sequence number of claim C is two greater than the sequence number of data packet P 726, this is indicative of one data packet being dropped 728. In this case data packets C and P are reversed, and then cross faded to form the new pseudo data packet 730. Otherwise, the sequence number of claim C is more than two greater than the sequence number of data packet P 726, which then implies that two or more data packets have been dropped 732. In this case data packet P is reversed and faded down to an inaudible level 734, and data packet C is reversed and faded up from an inaudible level 736. For any other missing packets, the data is held at an inaudible level to form any other required pseudo data packets 738.

Figure 8:
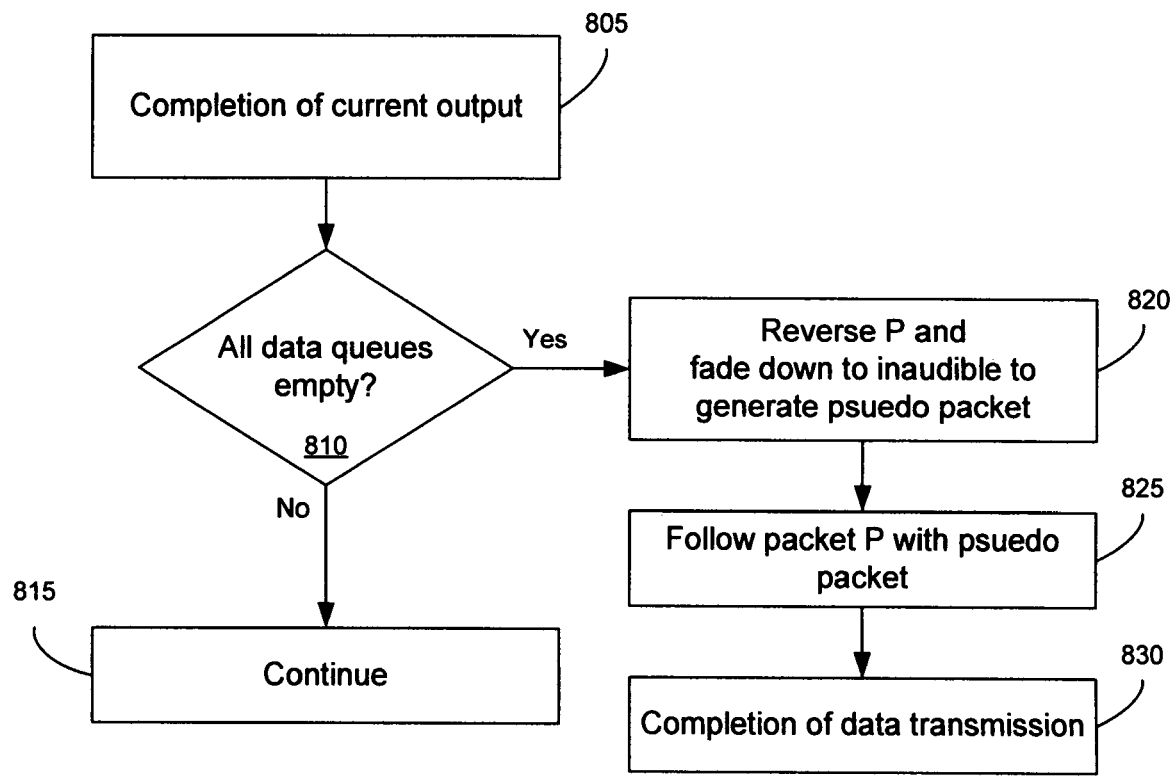
FIG. 8 is a flowchart to illustrate an embodiment of a process for data masking when data transmission is ceased.

FIG. 8 is a flowchart to illustrate an embodiment of a process for data masking when data transmission is ceased. In this illustration a current output from the transmitting unit to the receiving unit is completed 805. If all data queues are not empty 810, then the process continues for any additional data packets 815. If all data queues are empty 810, then data packet P is reversed and faded down to an inaudible level to generate a pseudo data packet 820. Data packet P is then followed by the generated pseudo data packet 825, and the data transmission is completed 830.

Figure 9:
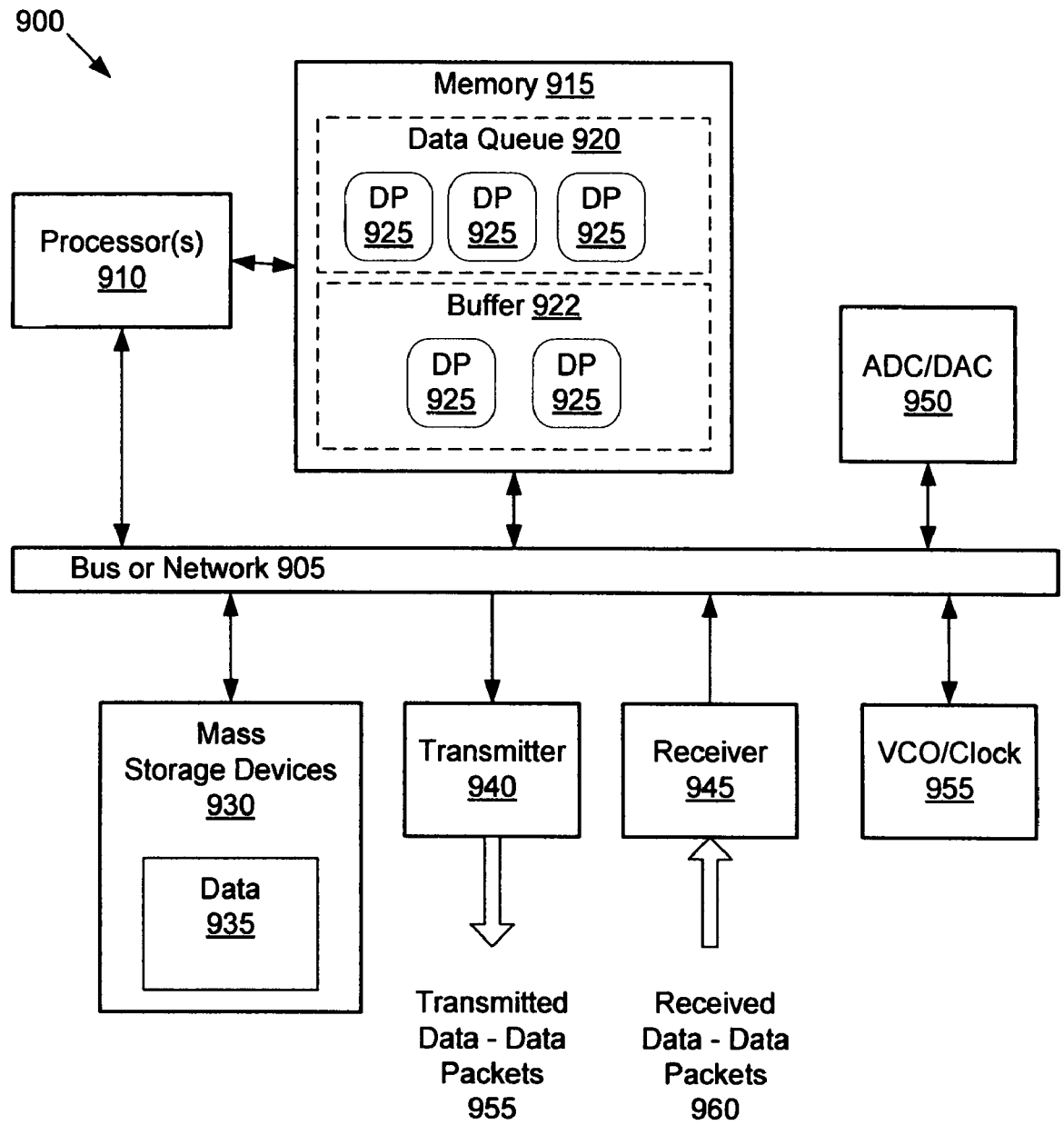
FIG. 9 is an illustration of an embodiment of a transmitting unit or receiving unit.

FIG. 9 is an illustration of an embodiment of a transmitting unit or receiving unit. The unit illustrated in FIG. 9 is one of a variety of different architectures that may be implemented. For ease of illustration, FIG. 9 is a simplified illustration that does include many well-known elements. As illustrated, the unit 900 may include one or more processors 905 and a memory 910, which are coupled with a communications bus or network 905 (which for simplicity is referred to herein as a "bus"). However, the bus 905 is an abstraction that represents any one or more separate physical buses, point-to-point connections, or both connected by appropriate bridges, adapters, or controllers. The bus 905 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 9, the processors 905 may include any control unit that can control the overall operation of the unit 900. A processor 905 may be, or may include, one or more programmable general-purpose or special-purpose microprocessors, network controller digital signal processors (DSPs), programmable logic controllers (PLCs), application specific integrated circuits (ASICs), programmable logic devices (PLDs), software, or hardware device, or a combination of such devices.

A memory 915 may be used to store data in operation. Memory 915 represents any form of random access memory (RAM), read-only memory (ROM), flash memory, cached memory, L1 or L2 memory, or the like, or a combination of such devices. In an embodiment, the memory of the unit 900 may include one or more transmission queues 920 for data packets 925 to be transmitted. In an embodiment, the memory 915 may include a data buffer 922 to hold data packets 925 that have been received.

The unit 900 may also include one or more mass storage devices 930 for the storage of data 935. Mass storage devices 925 may be or may include any conventional medium for storing data in a non-volatile manner, such as one or more magnetic or optical based disks.

The unit 900 may include a transmitter 940 for transmission of data including data packets 955 or a receiver 945 for the reception of data including data packets 960, or both a transmitter 940 and a receiver 945. The unit 900 may also include a voltage controlled oscillator (VCO) 950 used for the control of data sampling.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon instructions, which may be used to program computer (or other electronic devices) to perform a process according to the present invention. The computer-readable medium may include, but is not limited to, floppy diskettes, optical disks, CD-ROMs (compact disk red-only memory),and magneto-optical disks, ROMs (read-only memory), RAM's (random access memory), EPROM's (erasable programmable read-only memory), EEPROM's (electrically-erasable programmable read-only memory), magnet or optical cards, flash memory, or other type of computer-readable medium suitable for storing electronic instructions.

Many of the methods are described in their most basic form, but processes can be added to or deleted from any of the methods and information can be added or subtracted from any of the described messages without departing from the basic scope of the present invention. It will be apparent to those skilled in the art that further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   receiving a first data packet at a receiver, the first data packet containing a plurality of data elements, the first data packet being a data packet in a data stream received at the receiver, the first data packet being stored in a memory buffer;
   determining that one or more data packets are missing from the data stream prior to the first data packet;
   generating one or more pseudo data packets to replace the one or more missing data packets based at least in part on the one or more data elements of the first data packet, wherein generating a first pseudo data packet includes reversing the plurality of data elements of the first data packet and fading the plurality of data elements of the reversed first data packet up from a low level; and
   inserting the first pseudo data packet in the data stream prior to the first data packet.

2. The method of claim 1, further comprising receiving a second data packet prior to the first data packet, the second data packet having a plurality of data elements, and storing the second data packet in the memory buffer.

3. The method of claim 2, wherein generating the one or more pseudo data packets further includes generating a second pseudo data packet, generating the second pseudo data packet including reversing the plurality of data elements of the second data packet and fading the plurality of data elements of the reversed second data packet down to a low level; and further comprising inserting the second pseudo data packet in the data stream after the second data packet.

4. The method of claim 2, wherein generating the first pseudo data packet further includes reversing the plurality of data elements of the second data packet and fading the plurality of data elements of the reversed second data packet down to a low level, and combining the reversed first packet and the reversed second data packet to generate the first pseudo data packet.

5. The method of claim 1, where the first data packet contains audio data.

6. An apparatus comprising:
   a receiver to receive data packets, the data packets having a defined sequence;
   a buffer to hold one or more received data packets;
   a processor to process received data packets, wherein the processing of received data packets includes determination that one or more data packets are missing in the sequence and generation of one or more pseudo data packets to mask the one or more data packets that are missing in the sequence;
   wherein generating a first pseudo data packet by the processor includes:
      storing a first received data packet of the sequence in the buffer, the first received data packet including a plurality of data elements, reversing the plurality of data elements of the first received data packet and fading the plurality of data elements of the reversed first data packet up from a low level, and inserting the first pseudo data packet in the sequence prior to the first received data packet.

7. The apparatus of claim 6, wherein the data packets are time sensitive.

8. The apparatus of claim 7, wherein the one or more missing data packets are too late to be retransmitted to the apparatus.

9. The apparatus of claim 6, wherein generating a second pseudo data packet by the processor includes:

storing a second received data packet of the sequence in the buffer, the second received data packet including a plurality of data elements, the second received data packet being prior to the first received data packet in the sequence;

reversing the plurality of data elements of the second received data packet and fading the plurality of data elements of the reversed second data packet down to a low level, and inserting the second pseudo data packet in the sequence after the second received data packet.

10. The apparatus of claim 6, wherein the generation of the first pseudo data packet by the processor further includes:

storing a second received data packet of the sequence in the buffer, the second received data packet including a plurality of data elements, the second received data packet being prior to the first received data packet in the sequence;

reversing the plurality of data elements of the second received data packet and fading the plurality of data elements of the reversed second data packet down to a low level, and combining the first reversed data packet and the second reversed data packet to generate the first pseudo data packet.

11. The apparatus of claim 6, wherein the data elements are audio data and wherein the low level is an inaudible level.

12. A system comprising:

a transmitting unit, the transmitting unit to transmit a stream of data packets, the data packets being time sensitive; and a receiving unit, the receiving unit to receive the stream of data packets from the transmitting unit, the receiving unit includes a buffer to hold one or more data packets that are received from the transmitting unit and a processor to process received data packets, the receiving unit to mask one or more data packets that are missing from the stream of data packets by generating one or more pseudo data packets based at least in part on one or more received data packets;

wherein generating a first pseudo data packet by the receiving unit includes:

storing a first received data packet of the sequence in the buffer, the first received data packet including a plurality of data elements, reversing the plurality of data elements of the first received data packet and fading the plurality of data elements of the reversed first data packet up from a low level, and inserting the first pseudo data packet in the stream of data packets prior to the first received data packet.

13. The system of claim 12, wherein the transmitting unit includes a queue to hold data packets to be sent to the receiving unit.

14. The system of claim 12, wherein generating the one or more pseudo data packets including combining data from a first data packet with data from a second data packet.

15. An article of manufacture comprising:

a non-transitory computer-readable medium including data that, when accessed by a processor, cause the processor to perform operations comprising:

receiving a first data packet, the first data packet containing a plurality of data elements, the first data packet being a data packet in a data stream, the first data packet being stored in a memory buffer;

determining that one or more data packets are missing from the data stream prior to the first data packet;

generating one or more pseudo data packets to replace the one or more missing data packets based at least in part on the one or more data elements of the first data packet, wherein generating a first pseudo data packet includes reversing the plurality of data elements of the first data packet and fading the plurality of data elements of the reversed first data packet up from a low level; and inserting the first pseudo data packet in the data stream prior to the first data packet.

16. The article of manufacture of claim 15, wherein the generation of the one or more pseudo data packets is further based at least in part on data elements of a second data packet, the second data packet being received prior to reception of the first data packet.

17. The method of claim 3, further comprising inserting one or more additional pseudo data packets between the second pseudo data packet and the first pseudo data packet, the one or more additional pseudo data packets having data elements remaining at a low level.

* * * * *